US012778322B2

(12) United States Patent
Gulick, Jr. et al.

(10) Patent No.: US 12,778,322 B2
(45) Date of Patent: Nov. 3, 2026

(54) HANGING INVENTORY SECURITY DEVICE

(71) Applicant: Scorpion Security Products, Inc., Vestal, NY (US)

(72) Inventors: Franklyn W. Gulick, Jr., Binghamton, NY (US); Grant William Gulick, Endwell, NY (US); Adam Bixby, Endicott, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 19/028,907

(22) Filed: Jan. 17, 2025

(65) Prior Publication Data

US 2025/0228379 A1 Jul. 17, 2025

Related U.S. Application Data

(60) Provisional application No. 63/621,651, filed on Jan. 17, 2024.

(51) Int. Cl.
*A47F 5/08* (2006.01)
*E05B 45/06* (2006.01)
*E05B 47/00* (2006.01)

(52) U.S. Cl.
CPC ............ *A47F 5/0861* (2013.01); *E05B 45/06* (2013.01); *E05B 47/004* (2013.01)

(58) Field of Classification Search
CPC ....... A47F 5/0861; E05B 45/06; E05B 47/004
See application file for complete search history.

(56) References Cited

U.S. PATENT DOCUMENTS

| | | | | | |
|---|---|---|---|---|---|
| 1,609,817 | A * | 12/1926 | Hanton | E05B 67/003 | 70/49 |
| 5,259,220 | A * | 11/1993 | Fredrickson | A47F 5/0861 | 70/52 |
| 5,275,027 | A * | 1/1994 | Eklof | A47F 5/0861 | 70/38 A |
| 6,018,968 | A * | 2/2000 | Sides | E05C 19/18 | 292/288 |
| 7,566,037 | B2 * | 7/2009 | Vogler | A47F 1/128 | 248/221.11 |
| 9,167,918 | B2 * | 10/2015 | Leyden | A47F 5/0876 | |
| 10,156,088 | B2 * | 12/2018 | Bullwinkel | E05B 67/36 | |
| 11,098,502 | B2 * | 8/2021 | Jaworski | F16B 2/065 | |
| 2006/0157431 | A1 * | 7/2006 | Nagelski | A47F 5/0861 | 211/59.1 |
| 2016/0281393 | A1 * | 9/2016 | Bullwinkel | E05B 67/36 | |

* cited by examiner

*Primary Examiner* — Ko H Chan
(74) *Attorney, Agent, or Firm* — Barclay Damon LLP

(57) ABSTRACT

A hanging inventory security device includes a body that includes a first body portion comprising a plurality of first body portion mount surfaces and a second body portion comprising a plurality of second housing portion mount surfaces and pivotally coupled to the first body portion. The body further includes two or more mount portions each structured to receive a portion of an inventory hanger extending along a hanger axis. At least one mount member is positioned on one of the first and second body portions and a lock assembly is at least partially positioned in the body and move between a locked position and an unlocked position. In the unlocked position, the first body portion and the second body portion may be pivoted relative to each other, and in the locked position, they are inhibited from pivoting relative to each other and also inhibited from moving along the hanger axis.

20 Claims, 10 Drawing Sheets

HANGING INVENTORY SECURITY DEVICE

CROSS-REFERENCE TO RELATED APPLICATION

This claims priority and the benefit of U.S. Provisional Patent Application No. 63/621,651, filed on Jan. 17, 2024. The entire contents of said application is hereby incorporated by reference.

TECHNOLOGICAL FIELD

The following disclosure relates to the field of inventory security and specifically to a security device that inhibits theft of hanging inventory in a retail setting.

BACKGROUND

Inventory theft costs retailers billions of dollars every year. As thieves are becoming more sophisticated, retailers are being forced to invest more and more money on inventory security. Inventory security is even being used for inventory that is displayed on hanging display fixtures. Such hanging display fixtures generally include a plurality of hangers, extensions, or rods that support hanging inventory that are packaged or unpackaged and displayed for customer inspection and customer purchase. In order to inhibit shoplifters from removing one or more items of inventory by sliding them off of the extensions, a hanging inventory security device may be placed at the free end of the extensions. However, such devices are unreliable when being secured to an extension and are still are capable of moving relative to the extension, which provides shoplifters an opportunity to forcibly remove the device from the display fixture. Furthermore, current hanging inventory security devices are not capable of being properly secured to extensions of different or varying sizes.

These are just some of the problems associated with currently used hanging inventory security devices.

SUMMARY

Aspects of the following disclosure are directed to embodiments of a hanging inventory security device including a housing extending along a housing axis. In some embodiments, the housing includes two or more mount portions that are each structured to receive a portion of an inventory hanger that extends along a hanger axis. In some embodiments, the housing includes a first housing portion including a first plurality of mount surfaces and a second housing portion including a second plurality of mount surfaces. In some embodiments, the first housing portion and the second housing portion are pivotally coupled together. In some embodiments, the hanging inventory security device includes a mount member extending along the housing axis and positioned on one of the first and second housing portions. In some embodiments, the housing defines a lock cavity structured to at least partially accept a lock assembly that is configured to move between a locked position and an unlocked position. When in the unlocked position, the first housing portion and the second housing portion are configured to be pivoted relative to each other. When in the locked position, the first housing portion and the second housing portion are inhibited from pivoting relative to each other, and the portion of the inventory hanger is retained between one of the plurality of mount surfaces and the mount member to inhibit movement of the housing along the hanger axis.

In some embodiments of the hanging inventory security device, when in the locked position, the two or more mounting portions each comprise a mount opening formed by the plurality of first and second housing portion mount surfaces. In some embodiments of the hanging inventory security device, each of the mount openings comprises a unique diameter. Some embodiments of the hanging inventory security device further include an axle structured to pivotally couple together the first housing portion and the second housing portion. In some embodiments of the hanging inventory security device, one of the first and second housing portions includes a lock member engager configured to engage a portion of the lock assembly in the locked position. In some embodiments of the hanging inventory security device, the lock assembly further comprises a lock assembly housing, a lock assembly base structured to interact with the lock assembly housing, and a lock member structured to be supported by the lock assembly base. In some embodiments of the hanging inventory security device, when in the locked position, at least a portion of the lock member extends from the lock assembly housing and engages a portion of one of the first and second housing portions to inhibit pivoting of the first and second housing portions relative to each other.

Aspects of the following disclosure are directed to embodiments of a hanging inventory security device including a body extending along a body axis and including first and second body portions that are pivotally coupled to each other. In some embodiments, the first body portion comprises a first plurality of mount surfaces and the second body portion comprises a second plurality of mount surfaces. In some embodiments, the body comprises two or more mount portions that are each structured to receive a portion of an inventory hanger, wherein the inventory hanger extends along a hanger axis. In some embodiments, at least one mount member is positioned on one of the first and second body portions and a lock assembly is at least partially positioned in the body and configured to move between a locked position and an unlocked position. In some embodiments, in the unlocked position, the first body portion and the second body portion are configured to be pivoted relative to each other. In some embodiments, in the locked position, the first body portion and the second body portion are inhibited from pivoting relative to each other and inhibited from moving along a hanger axis.

In some embodiments of the hanging inventory security device, when in the locked position, the two or more mounting portions each comprise a mount opening formed by the plurality of first and second mount surfaces. In some embodiments of the hanging inventory security device, each of the mount openings defines a unique diameter. In some embodiments of the hanging inventory security device, the first body portion further includes a first coupling member and the second body portion includes a second coupling member, and wherein the first and second coupling members are configured to interact with each other to enable the first and second body portions to pivot relative to each other. In some embodiments of the hanging inventory security device, one of the first and second body portions includes a lock member engager configured to engage a portion of the lock assembly when in the locked position. In some embodiments of the hanging inventory security device, the lock assembly further comprise a lock assembly housing, a lock assembly base structured to interact with the lock assembly housing, and a lock member structured to be supported by the lock assembly base. In some embodiments of the hanging inventory security device, when in the locked position, at least a portion of the lock member extends from the lock assembly housing and engages one of the first and second housing portions to inhibit pivoting of the first and second body portions relative to each other. In some embodiments of the hanging inventory security device, the at least one mount member is comprised of a resilient material. In some embodiments, the resilient material includes a polymer or any material capable of elastically deforming from its original state in response to an applied force and generally return to its original state after that force is removed. The resilient material may be chosen based on the desired modulus of resilience (i.e., the maximum energy that can be absorbed per unit volume without creating a permanent distortion). In some embodiments of the hanging inventory security device, the mount openings comprise a diameter between 1 and 6 millimeters.

Aspects of the following disclosure are directed to embodiments of a method of manufacturing a hanging inventory security device. In some embodiments, the method includes structuring a housing to extend along a housing axis and comprise a first housing portion comprising a first plurality of mount surfaces, a second housing portion comprising a second plurality of mount surfaces and pivotally coupled to the first housing portion. In some embodiments, the method includes structuring the housing to include two or more mount portions that are each structured to receive a portion of an inventory hanger, wherein the inventory hanger extends along a hanger axis. Some embodiments of the method further include structuring at least one mount member to be positioned on one of the first and second housing portions and structuring a lock assembly to be at least partially positioned in the housing and to move between a locked position and an unlocked position. In some embodiments, the method further includes structuring the first housing portion and the second housing portion to be pivoted relative to each other when the lock assembly is in the unlocked position. In some embodiments, the method further includes structuring the first housing portion and the second housing portion to be inhibited from pivoting relative to each other and inhibited from moving along a hanger axis when the lock assembly is in the locked position.

In some embodiments, of the method, when the lock assembly is in the locked position, the two or more mounting portions are each structured to comprise a mount opening formed by the plurality of first and second housing portion mount surfaces. In some embodiments, the method further comprises structuring the lock assembly to comprise a lock assembly housing, a lock assembly base structured to interact with the lock assembly housing, and a lock member structured to be supported by the lock assembly base. In some embodiments, the method, further includes structuring at least a portion of the lock member to extend from the lock assembly housing and engage one of the first and second housing portions when in the locked position to inhibit the pivoting of the first and second housing portions relative to each other.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings.

Figure 1:
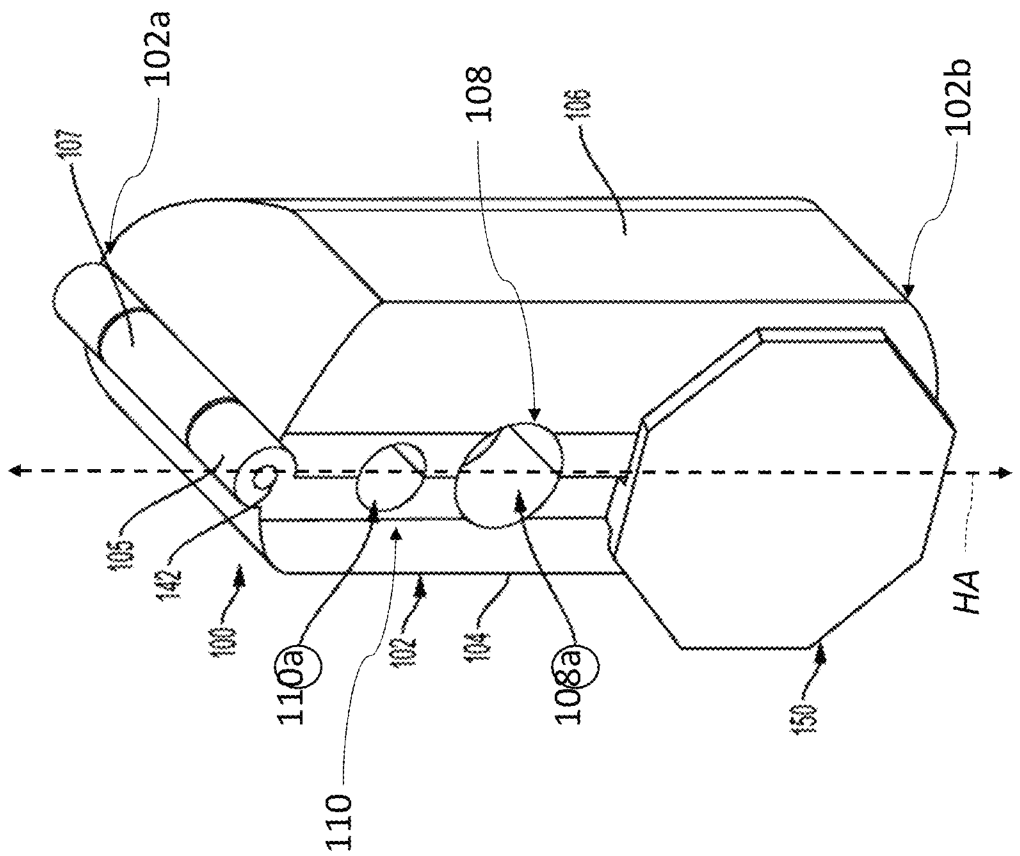
FIG. 1 illustrates a front perspective view of an embodiment of a hanging inventory security device.

The drawings depict salient features of the hanging inventory security device and are not specifically provided to scale.

DETAILED DESCRIPTION

The following discussion relates to various embodiments of a hanging inventory security device. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as “upper”, “lower”, “forward”, “rearward”, “interior”, “exterior”, “front”, “back”, “top”, “bottom”, “inner”, “outer”, “first”, “second”, and the like are not intended to limit these concepts, except where so specifically indicated. The terms “about” or “approximately” as used herein may refer to a range of 80%-125% of the claimed or disclosed value.

Throughout this disclosure, the word “including” indicates or means “including, without limitation,” the word “includes” indicates or means “includes, without limitation,” the phrases “such as” and “e.g.” indicate or mean “including, without limitation,” and the phrase “for example” refers to a non-limiting example.

Referring to FIGS. 1-6B, in some embodiments, the hanging inventory security device (“security device”) 100 comprises a body or housing 102 extending along a housing axis HA and including a first housing portion 104 and a second housing portion 106. In some embodiments, the first housing portion 104 includes a first mating member or a first coupling member 105 defining a first coupling member bore 105*a* and the second housing portion 106 includes a second mating member or a second coupling member 107 defining a second coupling member bore 107*a*. In some embodiments, at least one of the first coupling member 105 and the second coupling member 107 may include more than one portion. As shown in, the first coupling member 105 comprises two portions. In some embodiments, the first coupling member 105 and the second coupling member 107 are structured to interact with each other enable the pivoting of the first housing portion 104 and the second housing portion 106 relative to each other. To assemble some embodiments of the housing 102, the first coupling member bore 105*a* is aligned or otherwise cooperates with the second mating bore 107*a* to form a mating bore 109. As shown, the second coupling member 107 fits between the portions of the first coupling member 105. An axle 142 is at least partially positioned in the mating bore 109 and extends between opposing ends 109*a*, 109*b* of the mating bore. In some embodiments, the axle 142 pivotally couples the first housing portion 104 to the second housing portion 106. In this manner, the first housing portion 104 and the second housing portion 106 are able to pivot relative to each other between a closed/locked position (FIGS. 1, 2, 8 and 9) and an open position (FIGS. 3-7B).

Figure 2:
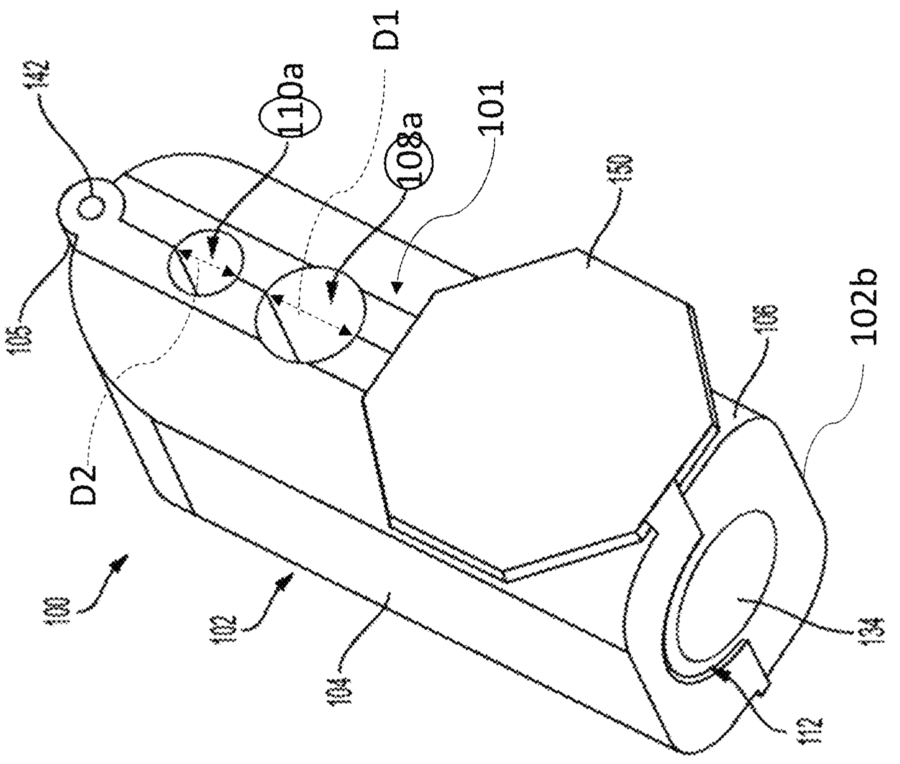
FIG. 2 illustrates a bottom perspective view of the embodiment of FIG. 1.
Figure 3:
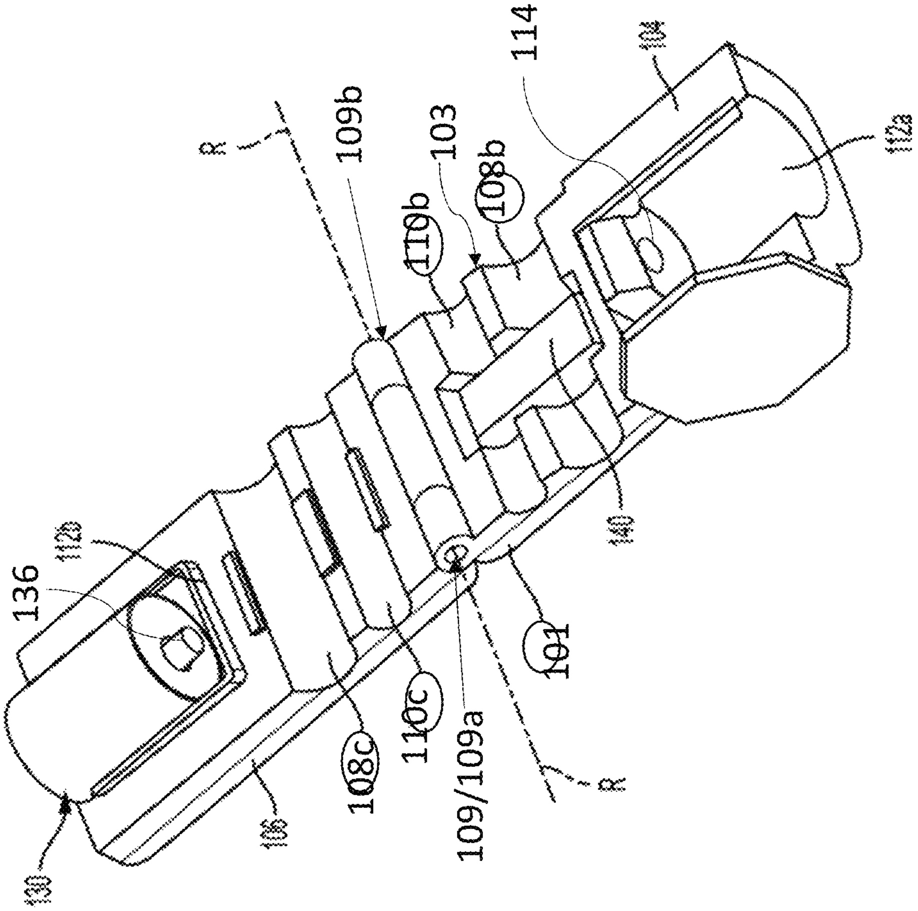
FIG. 3 illustrates a side perspective view of an embodiment of the hanging inventory security device in an unlocked and opened position.
Figure 4:
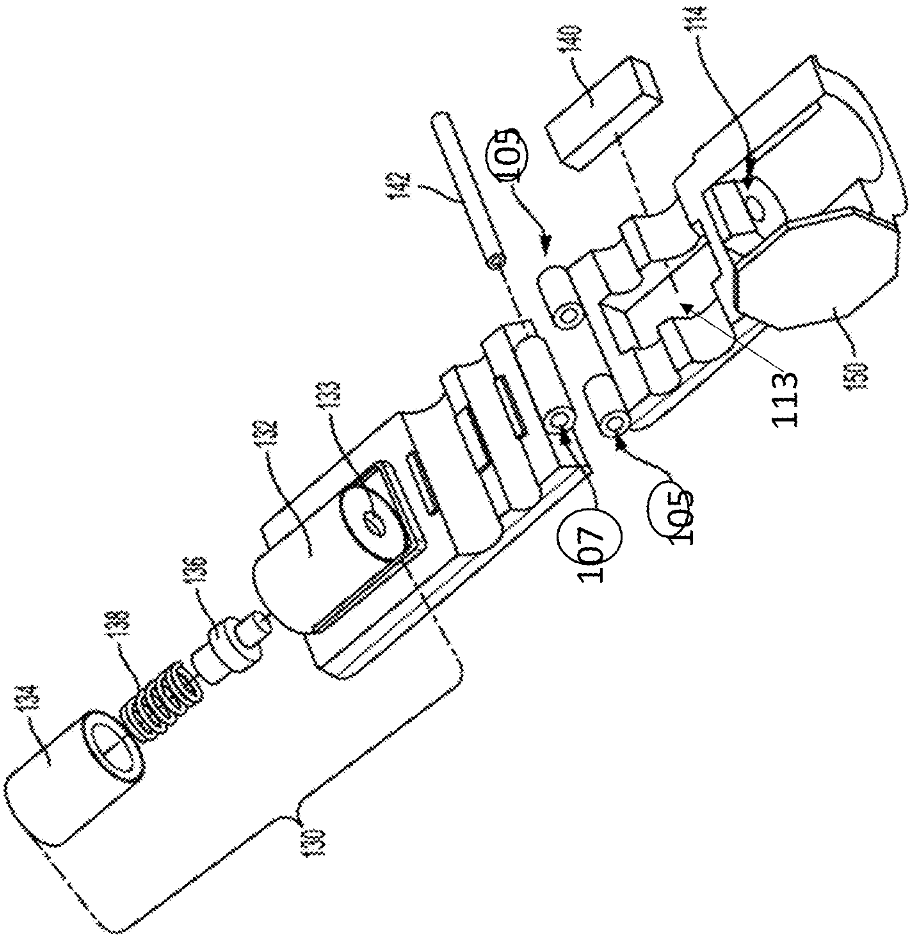
FIG. 4 illustrates an exploded view of the embodiment of FIG. 3.
Figure 5:
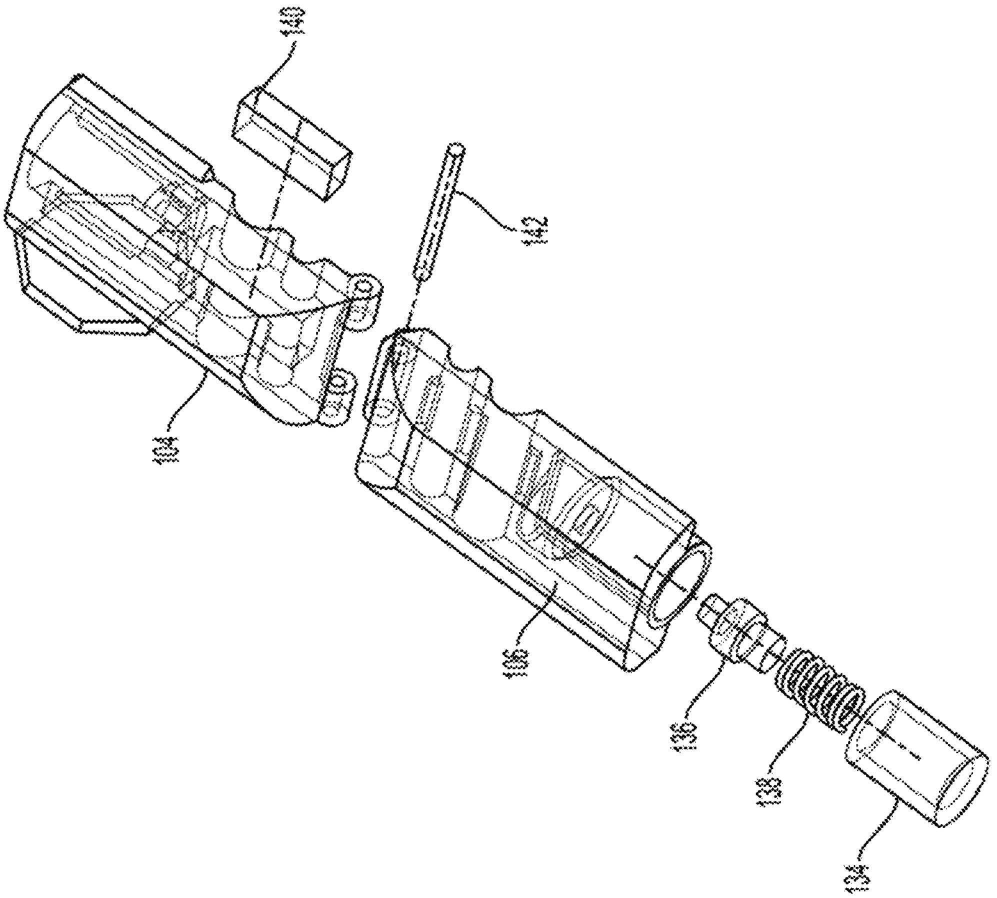
FIG. 5 illustrates the embodiment of FIG. 4 as shown from the opposite side and illustrated with a housing that is transparent.

Referring to FIGS. 1 and 2, the housing 102 includes a first mount portion 108 that defines a first mount opening, mount channel, or mount bore 108*a* having a first diameter D1, and a second mount portion 110 that defines a second mount opening, mount channel, or mount bore 110*a* having a second diameter D2 that is different than the first diameter. In some embodiments, the first diameter D1 is greater than the second diameter D2. Each of the first and second mount bores 108*a*, 110*a* traverses or extends through the housing 102 from a front surface 101 to an opposing rear surface 103 (see FIG. 4) and is structured to at least partially accept a portion of a product support, extension, or hanger 50 (FIGS. 8 and 9), which extends along a hanger axis Q.

In some embodiments, the housing 102 further defines a lock assembly cavity 112. In some embodiments, the first coupling member 105 and the second coupling member 107 are positioned towards a top 102*a* of the housing 102 and the lock assembly cavity 112 is positioned towards a bottom 102*b* of the housing 102. In some embodiments, the first mount bore 108*a* and the second mount bore 110*a* are positioned between the first and second coupling members 105, 107 and the lock assembly cavity 112.

Figure 8:
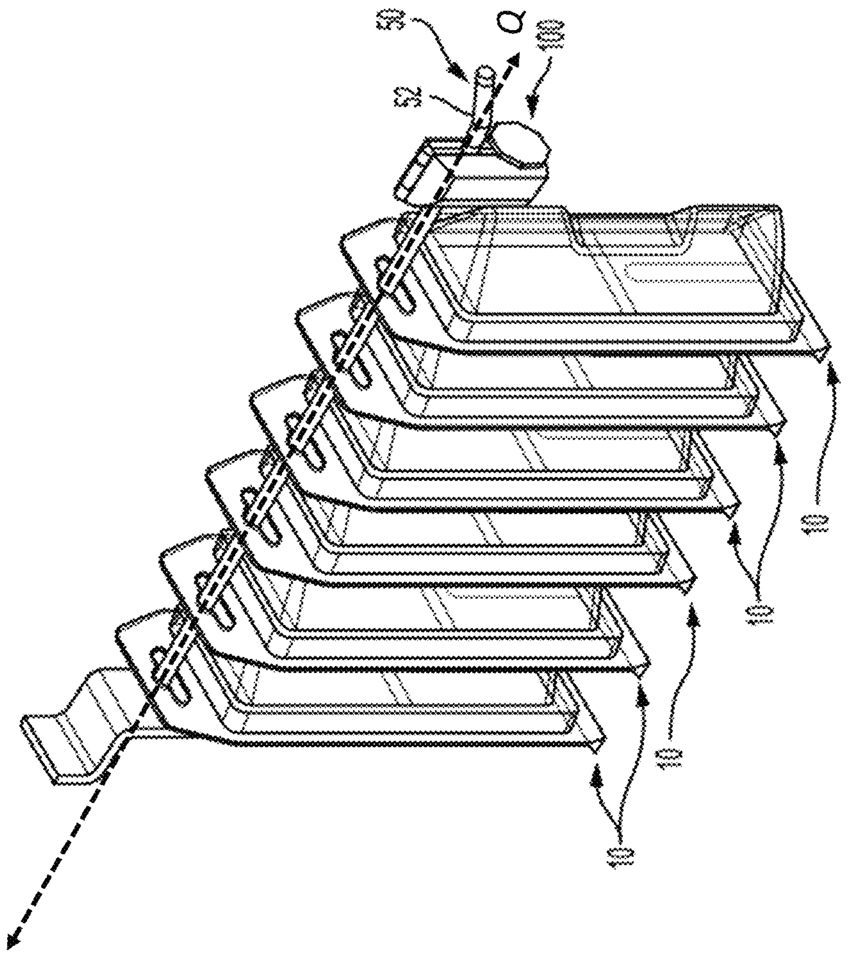
FIG. 8 illustrates a perspective view of an embodiment of the hanging inventory security device installed on a hanging display fixture and being used to secure a plurality of inventory items on the hanging display fixture.
Figure 9:
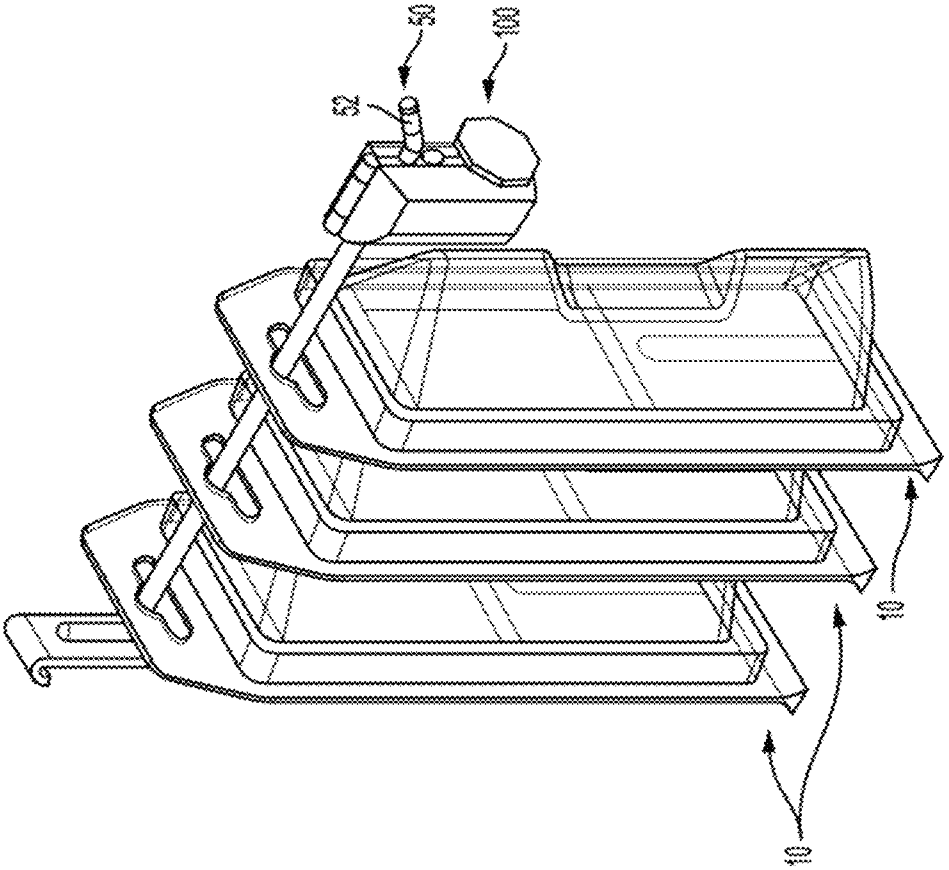
FIG. 9 illustrates another perspective view of the embodiment of the hanging inventory security device installed on a hanging display fixture and being used to secure a plurality of inventory items on the hanging display fixture.

As previously mentioned, the housing 102 defines a plurality of mount portions that each define a mount opening, mount bore or mount channel that each comprise a unique size, dimension, or diameter. For example, the embodiment of the housing 102 shown in FIGS. 6A-B defines first 108, second 110 and third 111 mount portions. In some embodiments, each of the first 108, second 110, and third 111 mount portions defines a mount bore 108*a*, 110*a*, 111*a* having first, second, and third diameters D1, D2, D3, respectively. In some embodiments, the first diameter>second diameter>third diameter. The varying diameters of each mount bore 108*a*, 110*a*, 111*a* enable the hanging security device 100 to be used with many different sizes of product hanger 50 (FIGS. 8 and 9). In some embodiments, the product hanger 50 (FIGS. 8 and 9) includes an extension, rod, or any suitable hanger that is coupled to a display fixture/surface at one end and is uncouples or otherwise free at an opposing end. Accordingly, inventory items are able to be hung from the product hanger 50 (FIGS. 8 and 9) and removed from the product hanger 50 (FIGS. 8 and 9) starting from the free end 52 (FIGS. 8 and 9).

In the open position as shown specifically in FIGS. 3-7B, the first housing portion 104 and the second housing portion 106 are generally complementary to each other. For example, the first housing portion 104 defines a plurality of depressions or first mount surfaces 108*b*, 110*b* (and 111*b*), and the second housing portion 106 defines a plurality of depressions or second mount surfaces 108*c*, 110*c* (and 111*c*). When the first housing portion 104 and the second housing portion 106 are pivoted together: first mount surface 108*b* aligns with second mount surface 108*c* to form the first mount bore 108*a*; and first mount surface 110*b* aligns with second mount surface 110*c* to form the second mount bore 110*a*. Likewise, in FIGS. 6A and 6B, first mount surface 111*b* aligns with second mount surface 111*c* to form the third mounting bore 111*a*. Similarly, the first housing portion 104 defines a first lock assembly cavity portion 112*a* and the second housing portion 106 defines a second lock assembly cavity portion 112*b*. Accordingly, when the first housing portion 104 and the second housing portion 106 are pivoted together, the first lock assembly cavity portion 112*a* and the second lock assembly cavity portion 112*b* align to form the lock assembly cavity 112.

Figure 6A:
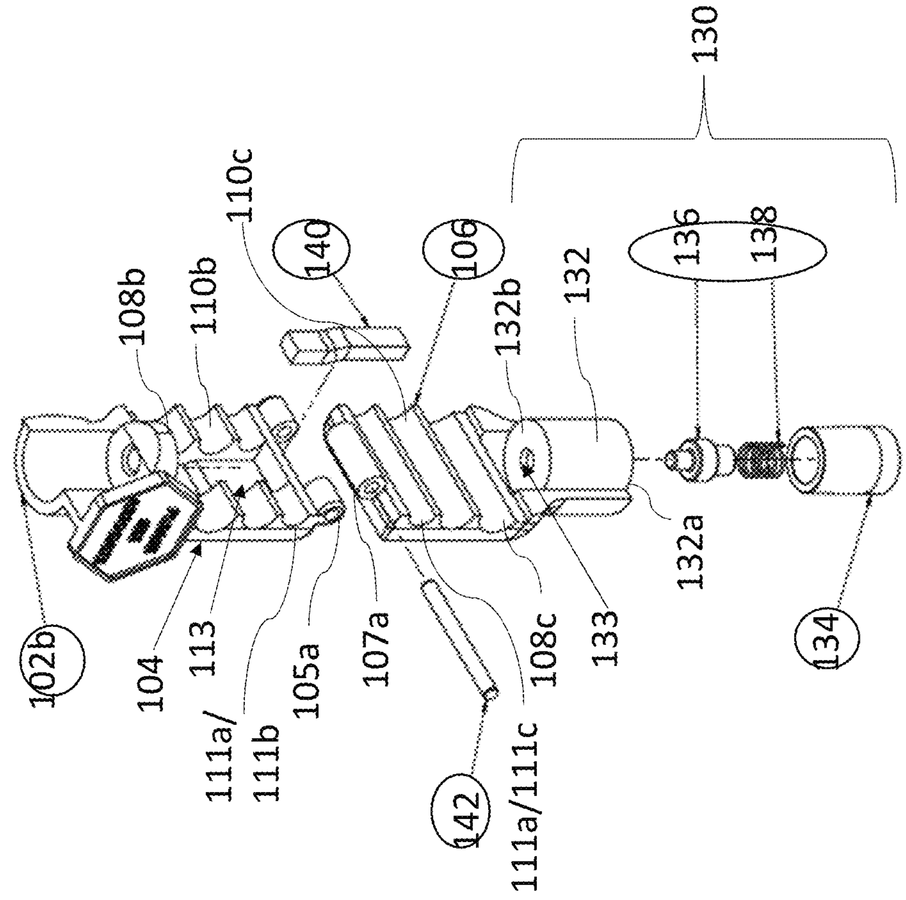
FIG. 6A illustrates an exploded view of another embodiment of a hanging inventory security device.
Figure 6B:
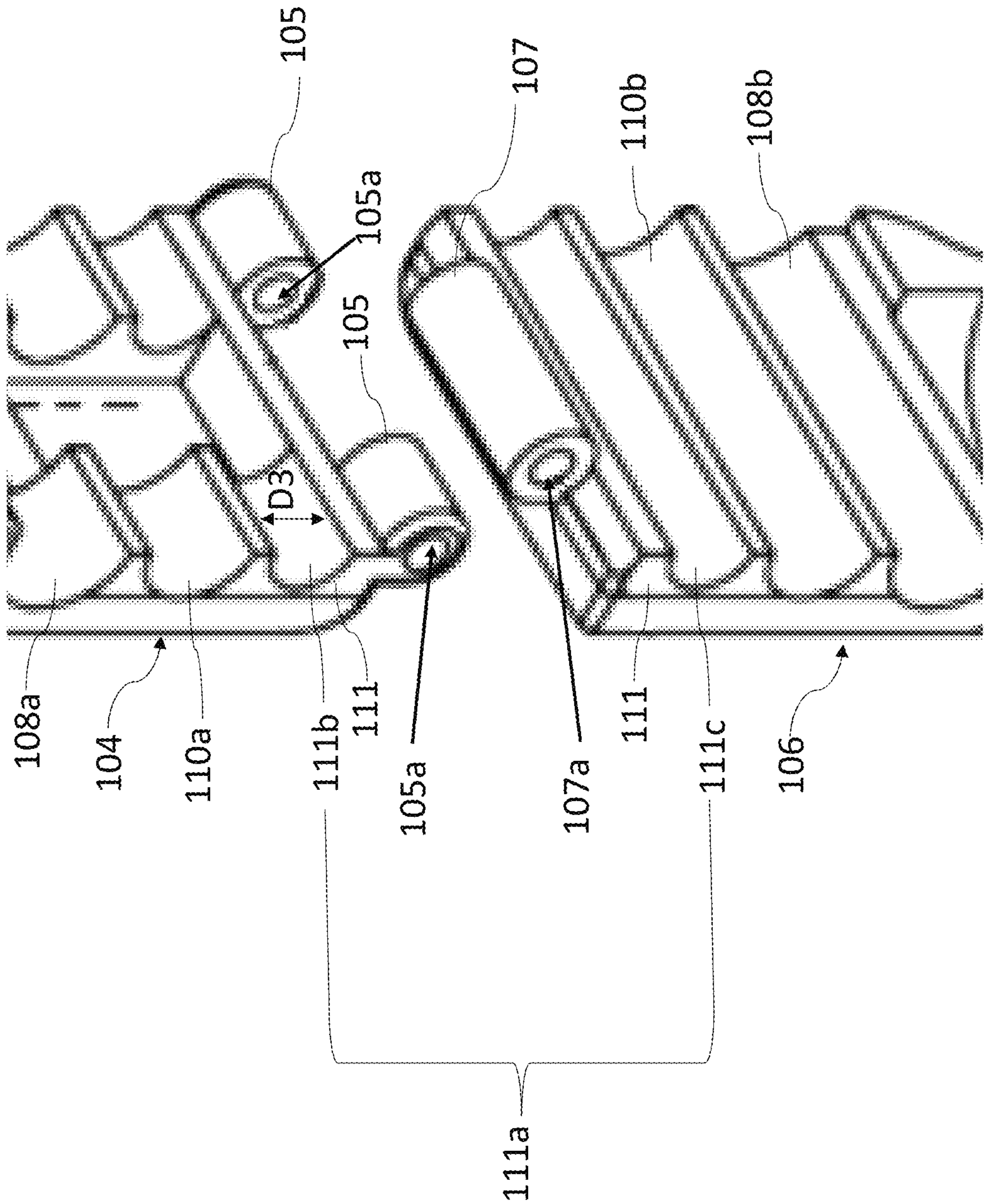
FIG. 6B illustrates a close-up, enlarged view of a portion of the embodiment of FIG. 6A.

Either or both of the first and second housing portions 104, 106 are structured to accept a mount member or a resilient member 140 within a portion of each of the plurality of mounting bores 108*a*, 110*a*, 111*a*. Referring to the embodiments of FIG. 4, a cut out or recess 113 extends along the housing axis HA between the mount surfaces 108*b*, 110*b* and is structured to at least partially accept the resilient member 140. As shown in the embodiment of FIG. 6A, the cut out 113 extends along the housing axis HA between the mount surfaces 108*b*, 110*b*, 111*b*. As shown, the resilient member 140 is structured to be seated or otherwise secured to the first housing portion 104, however in other embodiments the resilient member 140 may be structured to be seated or otherwise secured to the second housing portion 106. In still other embodiments, multiple resilient members 140 may be used such that each of the first and second housing portions 104, 106 includes at least one resilient member 140 that is secured to it.

As previously discussed, the first housing portion 104 of the housing 102 defines a first lock assembly cavity portion 112*a* and the second housing portion 106 defines a second lock assembly cavity portion 112*b*. Accordingly, when the housing 102 is in the closed position as shown specifically in FIG. 2, the first and second lock assembly cavity portions 112*a*, 112*b* come together to form the lock assembly cavity 112, which is structured to accept and retain at least a portion of the lock assembly 130. Referring primarily to FIGS. 3, 4, 6A, and 7A-B, the lock assembly 130 includes a lock assembly housing 132, which is shown as being formed as a barrel shape with a first end 132*a* that is at least partially open and an opposing second end 132*b* defining an orifice 133. In some embodiments, a lock assembly base or lock base 134 is structured to be at least partially inserted into the lock assembly housing 132. In some embodiments, the lock base 134 is structured to support a lock member 136 and a biasing member 138. In some embodiments, the biasing member 138 is positioned between the lock member 136 and the lock base 134. In some embodiments, the biasing member 138 is in contact with or coupled to the lock base 134. In some embodiments, the lock base 134 is formed from a magnetic material and structured to move the biasing member 138 and the lock member 136 relative to the lock assembly housing 132. Accordingly, in some embodiments, the lock assembly 130 is assembled by inserting the lock base 134, which supports the lock member 136 and the biasing member 138, into the first end 132*a* of the lock assembly housing 132. The lock assembly 130 is then placed or inserted into the first or second lock assembly cavity portions 112*a*, 112*b*.

Referring to FIGS. 8 and 9, a portion of a hanging inventory display fixture is illustrated showing the product support, rod, or inventory hanger 50 holding a plurality of inventory items 10. As shown, each of the plurality of inventory items 10 is slid onto the inventory hanger 50 such that they cannot be pulled from the inventory hanger 50 and can only be removed by being slid off or removed from a free end 52 of the inventory hanger 50.

Operation/installation of the hanging inventory security device 100 will now be discussed with reference to FIGS. 1-3, 8, and 9. As shown, for example in FIG. 3, the housing 102 is arranged in the open position such that the free end 52 of the inventory hanger 50 or a portion of the inventory hanger 50 towards the free end 52 may be positioned on one of the mount surfaces 108*b*, 108*c*, 110*b*, 110*c* (or 111*b*, 11*c*). For the sake of the following discussion, reference will be made to the embodiment shown in FIG. 9 where the security device 100 is installed onto the inventory hanger 50 through the first mount bore 108*a*.

Figure 7B:
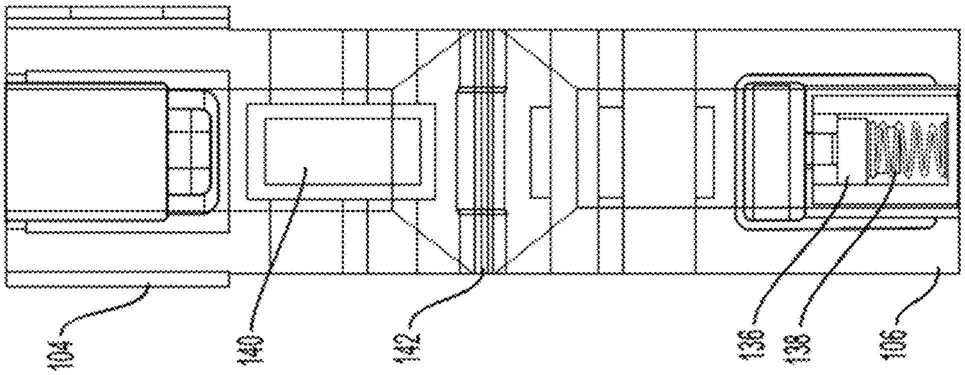
FIG. 7B illustrates the embodiment of FIG. 5 with the lock assembly in an unlocked position.

Once the portion of the inventory hanger 50 is positioned on one of the mount surfaces 108*b*, 108*c*, 110*b*, 110*c*, 111*b*, 111*c*, the housing 102 is then pivoted about the pivot axis R to move the housing 102 from the open position into the closed position as shown in FIGS. 1, 2, 8 and 9. In the closed position, the resilient member 140 is pressed against the inventory hanger 50, which creates a friction fit between the inventory hanger 50 and the resilient member 140, thereby inhibiting movement of the housing 102 relative to the inventory hanger 50. In an embodiment, the lock assembly 130 must be in the unlocked position as shown in FIG. 7B in order for the housing 102 to be moved from the open position to the closed position. Once the housing 102 is moved to the closed position, the lock assembly 130 is moved to the locked position as shown, for example, in FIG. 7A. In some embodiments, the lock assembly 130 automatically moves to the locked position (7B) when the housing 102 is moved to the closed position. When in the lock assembly 130 is in the locked position, the biasing member 138 urges at least a portion of the lock member 136 through the orifice 133 of the lock assembly housing 132 and into engagement with a lock member engager 114 in the first housing portion 104. The engagement of the lock member 136 with the lock member engager 114 inhibits the first housing portion 104 and the second housing portion 106 from pivoting relative to each other. At this point, the security device 100 is installed or locked onto the inventory hanger 50 thereby inhibiting removal of items of inventory 10 from the free end 52 of the inventory hanger 50.

In some embodiments, an indicator 150 may be formed as part of the housing 102 and structured to inform a user of the locked state of the security device 100 and or provide notice to customers to ask for a salesperson in order to access the items of inventory 10. Should the first mounting bore 108*a* not be sized to properly secure the security device 100 to the inventory hanger 50, the second mounting bore 110*a* may be used instead an in a similar manner. In some embodiments, more than two mounting bores may be provided where each has a different diameter. In some embodiments, the diameters D1, D2 . . . $D_N$ are between 1 and 6 millimeters. In some embodiments, the diameters D1, D2 . . . $D_N$ are not greater than 4 millimeters.

Figure 7A:
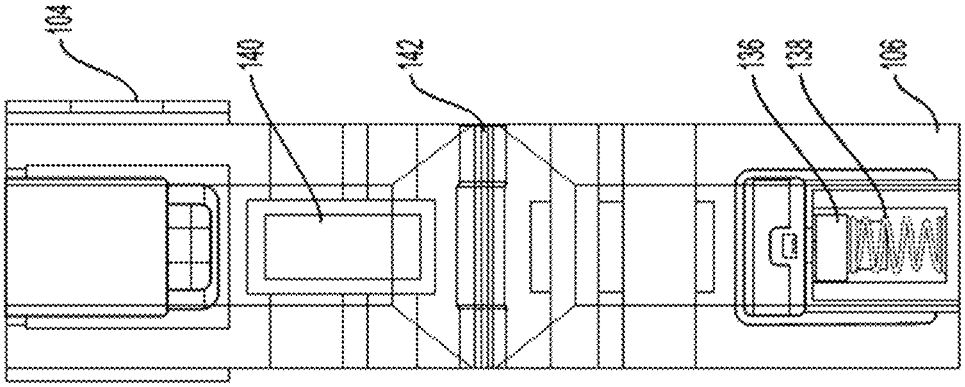
FIG. 7A illustrates the embodiment of FIG. 5 with the lock assembly in a locked position.

In order to remove the security device 100, the lock assembly 130 is moved from the locked position to the unlocked position (FIG. 7A). In the unlocked position, the lock member 136 disengages from the lock member engager 114 so that the first housing portion 104 and the second housing portion 106 are enabled to pivot relative to each other about the pivot axis R. Pivoting the first and second housing portions 104, 106 away from each other facilitates removal of the security device 100 from the inventory hanger 50. Once the security device 100 is removed, then the items of inventory 10 may be removed from the free end 52 of the inventory hanger 50. In an embodiment, a key is used to lock and unlock the lock assembly 130. In a further embodiment, the key comprises a magnetic element configured to be touched to a bottom of the housing 102 near the lock base 134 in order to attract the lock base 134 and/or the lock member 136 towards the key, which disengages the lock member 136 from the lock member engager 114. In the same embodiment, removal of the key from the proximity of the lock base 134 results in the biasing member 138 relaxing and the lock member 136 again being biased into engagement with the lock member engager 114 (when the housing 102 is in the closed position). In still other embodiments, the lock assembly is electronically actuated between the locked and unlocked states. In some embodiments, the security device 100 further includes a transmitter/receiver/processor that is configured to send status information and receive commands including commands to lock/unlock the security device 100. In some embodiments, the security device 100 further includes an alarm that is configured to trigger when the security device 100 has been forcibly removed from the inventory hanger 50 or otherwise tampered with. In some embodiments, the alarm may be in electrical communication with the transmitter/receiver/processor. In some embodiments, the alarm may include an auditory and/or visual and/or electronic output.

At least some of the parts, components, and structural elements of the security device 100 can be combined into an integral or unitary, one-piece object through welding, soldering, plastic molding other methods, or such parts, components, and structural elements can be distinct, removable items that are attachable to each other through screws, bolts, pins and other suitable fasteners.

In the foregoing description, certain components or elements may have been described as being configured to mate with each other. For example, an embodiment may be described as a first element (functioning as a male) configured to be inserted into a second element (functioning as a female). It should be appreciated that an alternate embodiment includes the first element (functioning as a female) configured to receive the second element (functioning as a male). In either such embodiment, the first and second elements are configured to mate with, fit with or otherwise interlock with each other.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. A hanging inventory security device comprising:

a housing extending along a housing axis and comprising, a first housing portion comprising a first plurality of mount surfaces, a second housing portion comprising a second plurality of mount surfaces and pivotally coupled to the first housing portion, two or more mount portions each structured to receive a portion of an inventory hanger, wherein the inventory hanger extends along a hanger axis that intersects the housing axis, a mount member extending along the housing axis and positioned on one of the first and second housing portions, wherein the mount member is positioned within a portion of each of the two or more mount portions, a lock cavity; and a lock assembly at least partially positioned in the lock cavity and configured to move between a locked position and an unlocked position, wherein in the unlocked position, the first housing portion and the second housing portion are configured to be pivoted relative to each other, and wherein in the locked position, the first housing portion and the second housing portion are inhibited from pivoting relative to each other, and the portion of the inventory hanger is retained between one of the plurality of mount surfaces and the mount member to inhibit movement of the housing along the hanger axis.

2. The hanging inventory security device of claim 1, wherein in the locked position, the two or more mounting portions each comprise a mount opening formed by the plurality of first and second housing portion mount surfaces.

3. The hanging inventory security device of claim 2, wherein each of the mount openings comprises a unique diameter.

4. The hanging inventory security device of claim 1, further comprising an axle structured to pivotally couple together the first housing portion and the second housing portion.

5. The hanging inventory security device of claim 1, wherein one of the first and second housing portions includes a lock member engager configured to engage a portion of the lock assembly in the locked position.

6. The hanging inventory security device of claim 1, wherein the lock assembly further comprises, a lock assembly housing, a lock assembly base structured to interact with the lock assembly housing, and a lock member structured to be supported by the lock assembly base.

7. The hanging inventory security device of claim 6, wherein in the locked position, at least a portion of the lock member extends from the lock assembly housing and engages a portion of one of the first and second housing portions to inhibit pivoting of the first and second housing portions relative to each other.

8. A hanging inventory security device comprising:

a body extending along a body axis and comprising, a first body portion comprising a first plurality of mount surfaces, a second body portion comprising a second plurality of mount surfaces and pivotally coupled to the first body portion, two or more mount portions each structured to receive a portion of an inventory hanger, wherein the inventory hanger extends along a hanger axis that intersects the body axis;

at least one mount member positioned on one of the first and second body portions, wherein the at least one mount member is positioned within a portion of each of the two or more mount portions; and a lock assembly at least partially positioned in the body and configured to move between a locked position and an unlocked position, wherein in the unlocked position, the first body portion and the second body portion are configured to be pivoted relative to each other, and wherein in the locked position, the first body portion and the second housing portion are inhibited from pivoting relative to each other and inhibited from moving along the hanger axis.

9. The hanging inventory security device of claim 8, wherein in the locked position, the two or more mounting portions each comprise a mount opening formed by the plurality of first and second mount surfaces.

10. The hanging inventory security device of claim 9, wherein each of the mount openings comprises a defines diameter.

11. The hanging inventory security device of claim 8, wherein the first body portion further includes a first coupling member and the second body portion includes a second coupling member, and wherein the first and second coupling members are configured to interact with each other to enable the first and second body portions to pivot relative to each other.

12. The hanging inventory security device of claim 8, wherein one of the first and second body portions includes a lock member engager configured to engage a portion of the lock assembly in the locked position.

13. The hanging inventory security device of claim 8, wherein the lock assembly further comprises, a lock assembly housing, a lock assembly base structured to interact with the lock assembly housing, and a lock member structured to be supported by the lock assembly base.

14. The hanging inventory security device of claim 13, wherein in the locked position, at least a portion of the lock member extends from the lock assembly housing and engages one of the first and second body portions to inhibit pivoting of the first and second body portions relative to each other.

15. The hanging inventory security device of claim 8, wherein the at least one mount member is comprised of a resilient material.

16. The hanging inventory security device of claim 9, wherein the mount openings comprise a diameter between 1 and 6 millimeters.

17. A method of manufacturing a hanging inventory security device, comprising:

structuring a housing to extend along a housing axis and comprise, a first housing portion comprising a first plurality of mount surfaces, a second housing portion comprising a second plurality of mount surfaces and pivotally coupled to the first housing portion, and two or more mount portions each structured to receive a portion of an inventory hanger, wherein the inventory hanger extends along a hanger axis that intersects the housing axis;

structuring at least one mount member to be positioned on one of the first and second housing portions and also positioned within a portion of each of the two or more mount portions; and structuring a lock assembly to be at least partially positioned in the housing and to move between a locked position and an unlocked position, wherein in the unlocked position, the first housing portion and the second housing portion are structured to be pivoted relative to each other, and wherein in the locked position, the first housing portion and the second housing portion are inhibited from pivoting relative to each other and inhibited from moving along the hanger axis.

18. The method of claim 17, further comprising structuring the two or more mounting portions to each comprise a mount opening formed by the plurality of first and second housing portion mount surfaces when in the locked position.

19. The method of claim 17, further comprising the lock assembly to comprise:

a lock assembly housing;

a lock assembly base structured to interact with the lock assembly housing; and a lock member structured to be supported by the lock assembly base.

20. The method of claim 19, further comprising structuring at least a portion of the lock member to extend from the lock assembly housing and engage one of the first and second housing portions when in the locked position to inhibit the pivoting of the first and second housing portions relative to each other.

* * * * *